Oct. 28, 1924.　　　　　　　　　　　　　　　　　1,513,430
C. F. SCOTT
AUTOMOTIVE CHASSIS EFFICIENCY TESTING DYNAMOMETER
Filed April 21, 1922　　　2 Sheets-Sheet 2
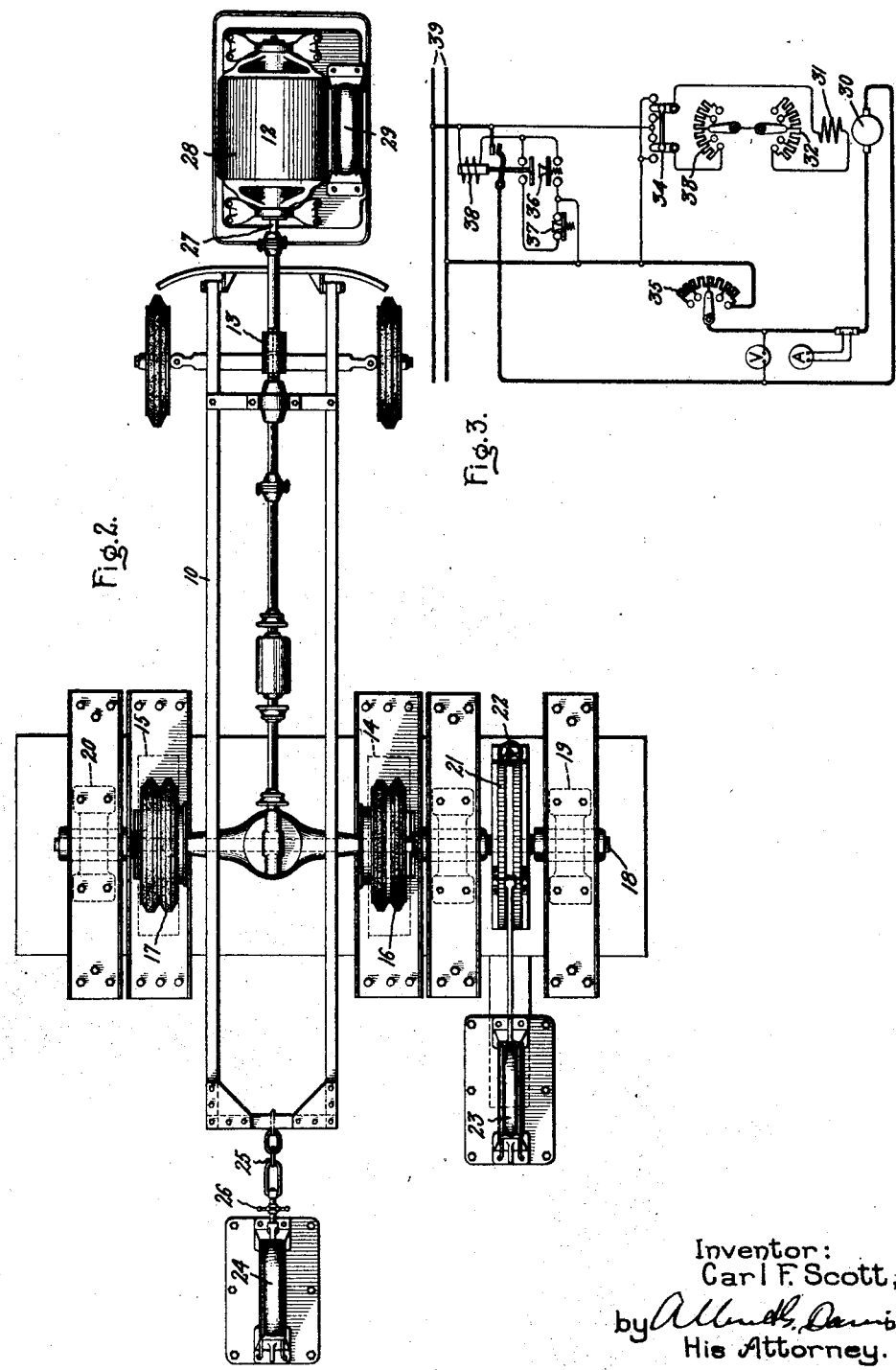
Inventor:
Carl F. Scott,
by Albert G. Davis
His Attorney.

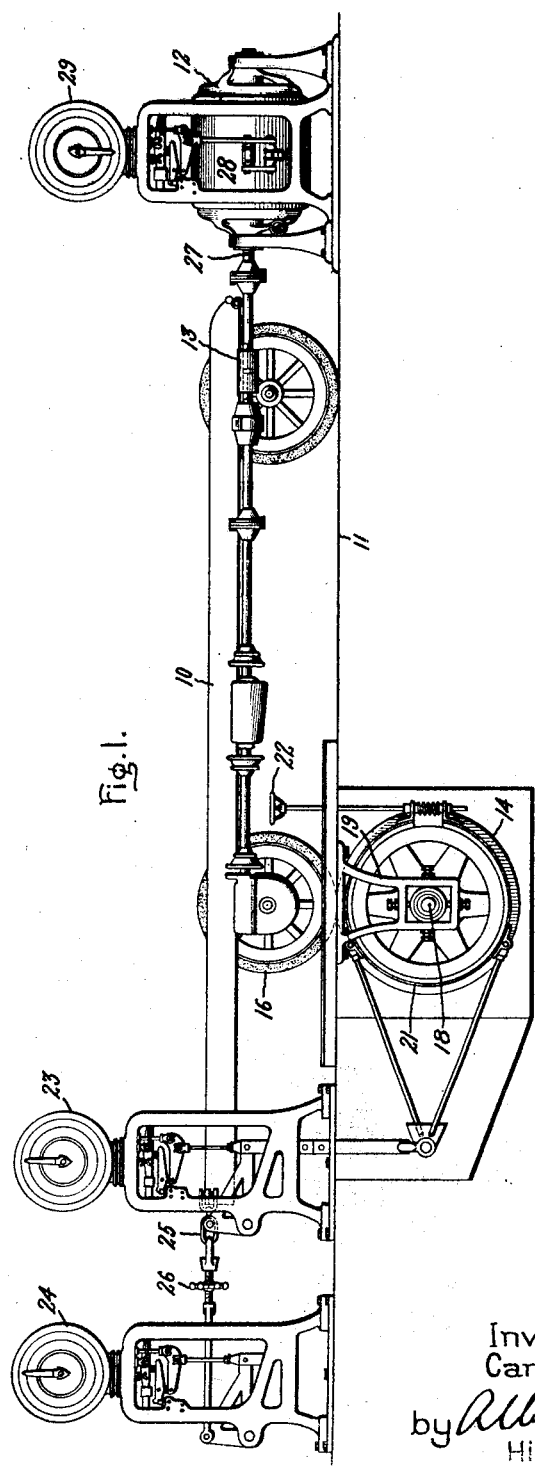

Patented Oct. 28, 1924.

1,513,430

UNITED STATES PATENT OFFICE.

CARL F. SCOTT, OF YONKERS, NEW YORK, ASSIGNOR TO GENERAL ELECTRIC COMPANY, A CORPORATION OF NEW YORK.

AUTOMOTIVE CHASSIS EFFICIENCY-TESTING DYNAMOMETER.

Application filed April 21, 1922. Serial No. 555,920.

*To all whom it may concern:*

Be it known that I, CARL F. SCOTT, a citizen of the United States, residing at Yonkers, in the county of Westchester, State of New York, have invented certain new and useful Improvements in Automotive Chassis Efficiency-Testing Dynamometers, of which the following is a specification.

One of the objects of my invention is to provide a convenient and efficient arrangement for testing the complete train of transmission in an automotive vehicle, particularly the power transmitting elements of the vehicle between the power plant and the driving wheel surface, while simulating service conditions in speed and power transmitted, with the chassis of the vehicle held in a fixed position.

This and other objects of the invention as will be in part evident to those skilled in the art and in part explained fully hereinafter, are attained in the automotive chassis efficiency testing equipment illustrated in the accompanying drawings, in which Fig. 1 is a side perspective view of my improved chassis testing equipment, Fig. 2 is a plan view of the same and Fig. 3 is a simplified diagram of the electrical connections for the electric driving motor of the equipment.

Referring to the drawings the chassis 10 of the automotive vehicle is placed on a testing platform 11 so as to be in the proper position with respect to the testing equipment. The electric motor 12 is located on the testing platform at the front end of the vehicle and the rotating element or armature of this motor is arranged to be connected so as to drive the power transmitting elements of the vehicle, by means of a spline coupling 13 which permits of relative movement between the vehicle and the shaft of the driving motor axially of the driving motor. Located in a pit below the surface of the testing platform 11 are the traction drums 14 and 15 on which the rear wheels of the vehicle 16 and 17 respectively are adapted to rest so as to drive the traction drums. The traction drums are both mounted on a shaft 18 which may be suspended from the testing platform in any suitable manner, as by means of the hangers 19 and 20 so that the vehicle may be in the horizontal position while being tested. A prony brake 21 of well known construction, having a brake wheel and adjustable brake band is provided for applying a braking effect to the wheels of the vehicle. This prony brake may be adjusted so as to vary the braking effect by means of the hand wheel 22 located above the platform 11 so as to be within easy reach of the operator. The braking effect of the prony brake may be measured in any suitable manner, as for example, by means of the scale beam dynamometer 23 which is connected to the brake band of the prony brake. This scale beam dynamometer is of a well known construction and it is believed that those skilled in the art will not need a detailed description of the same. The forward thrust of the vehicle may be measured in any suitable manner, as for example, by means of the scale beam dynamometer 24 which is arranged to be connected to the rear end of the chassis by means of the chain 25, and the connection between the dynamometer and the chassis may be adjusted by means of the hand-wheel 26.

The electric driving motor 12 is preferably of the floating field frame type having a rotating armature member connected to the shaft 27 and a floating type field frame 28 which is mounted in end bearings so that the field frame may revolve as well as the armature. The scale beam dynamometer 29 is connected to the rotatable field frame 28 of the motor so as to measure the torque of the driving motor.

In order to regulate the speed of the motor so as to thereby simulate the speed and power transmitted by the vehicle under service conditions, I have provided a system of control for the motor which is shown very diagrammatically in Fig. 3. Referring to this figure, it will be seen that the electric motor is of the direct current type having an armature 30 and a shunt field 31. The excitation of this field and therefore the speed of the motor may be varied by varying the field rheostats 32 and 33. The reversing switch 34 is provided for reversing the direction of current in the motor field so as to thereby reverse the direction of rotation of the motor. The current in the motor armature circuit may be varied by means of the rheostat 35 which also serves as a starting rheostat to limit the rush of current taken by the motor in starting. The motor is manually controlled by means of the normally open start push button 36 and the normally closed stop push button 37 which control the line contactor 38.

As thus constructed and arranged the operation of my invention is as follows: Let it be assumed that the chassis of the vehicle has been placed in a proper position on the testing platform and that the connections between the driving motor and the various dynamometer measuring devices have been made as shown in the drawings. In order to start the driving motor, the reversing switch 34 will first be thrown so as to energize the motor field for the proper direction of motor operation. The start push button 36 will then be closed so as to energize the line contactor 38 to close and connect the motor armature to the source of supply 39. When the line contactor 38 closes, it makes a holding circuit for its winding independently of the start push button 36 so that the start push button may be released. The rheostat 35 in the armature circuit of the motor is adjusted so as to increase the motor speed and the rheostats 32 and 33 will also be adjusted so that the speed of the motor is approximately the speed desired for testing purposes.

The prony brake 21 connected to the traction drums 14 and 15 will be adjusted so that a certain reactive effect is had, as will appear on the scale of the dynamometer 23. In case the speed of the driving motor is varied from the speed originally determined upon due to the variation in the load of the prony brake, the field and armature rheostats of the electric motor may be adjusted so that the speed of the motor is the value desired. The value of the forward thrust of the vehicle may be read on the scale of the dynamometer 24, the reactive torque on the wheels of the vehicle may be read directly from the scale of the dynamometer 23 and the torque of the driving motor may be read directly from the scale of the dynamometer 29. The speed of the driving motor and the drive shaft of the vehicle may be determined by any suitable form of a tachometer (not shown) and the speed of the traction drums may also be read by any suitable form of a tachometer (not shown).

The power output of the motor is the product of the speed of the motor times the reading of the scale of the dynamometer 29, times the constant of the dynamometer. The power transmitted through the transmitting elements, less the friction losses, is the power taken off at the prony brake. The power taken off at the prony brake is the product of the reading of the scale of the dynamometer 23 times the speed of the brake wheel of the prony brake, times the constant for the dynamometer. The forward thrust of the vehicle may be read directly from the scale of the dynamometer 24 and the power which the vehicle can exert at any speed is the reading of this scale times the speed which the vehicle would obtain on the road times the constant of the scale. The efficiency of the transmitting elements of the chassis is the ratio of the power taken off at the prony brake to the power output of the motor.

The road or service conditions encountered by the vehicle may be simulated by varying the speed of the driving motor by means of the rheostats shown so that any desired speed and tractive effort of the machine may be had as desired. By means of my arrangement the complete train of power transmission of the chassis may be tested without removal from the chassis and the tests can be made under substantially the exact conditions of power transmitted and speed which would ordinarily be expected in service.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A dynamometer for testing the efficiency of the power transmitting elements of an automotive vehicle, comprising an electric motor for driving the said transmitting elements, means for connecting the rotating element of said motor to drive the transmitting elements of the vehicle, rotatable means on which the wheels of the vehicle are adapted to rest to form a driving connection therewith, means connected to the said rotatable means to measure the reactive torque, means connected to the vehicle to measure the forward thrust of the vehicle, and means for measuring the power output of the said motor.

2. A dynamometer for testing the efficiency of the power transmitting elements of an automotive vehicle, comprising a testing platform, an electric motor at one end of the said platform, means for connecting the rotating element of the said motor to drive the transmitting elements of the vehicle, a pair of traction drums located below the surface of the platform on which the wheels of the vehicle rest so as to drive the drums, a variable brake connected to the said drums, means for measuring the braking effect on the said drums, means connected to the vehicle to measure the forward thrust of the vehicle, and means for measuring the power output of the said motor.

3. A dynamometer for testing the efficiency of the power transmitting elements of an automotive vehicle, comprising an electric motor having a rotatable field frame member and a rotatable armature member, means connected to one of said members for measuring the power output of the motor, means for connecting the other of said members to drive the transmitting elements of the vehicle, a pair of traction drums on which the wheels of the vehicle are adapted to rest so as to drive the drums, a prony brake connected to the said drums, and means for measuring the braking effect of the said prony brake and the forward thrust of the vehicle.

4. A dynamometer for testing the efficiency of the power transmitting elements of an automotive vehicle between the engine and the surface of the rear driving shaft of the vehicle comprising an electric motor having a floating type field frame, means connected to the said field frame to measure the torque of the motor, means for independently varying the field and armature currents of the said motor, a spline coupling for connecting the armature of said machine with the drive shaft of the vehicle, a pair of traction drums on which the wheels of the vehicle are adapted to rest so as to drive the said drums, a prony brake dynamometer connected to the said drums to measure the reactive torque, and a dynamometer connected to the rear end of the vehicle to measure the forward thrust of the vehicle.

In witness whereof, I have hereunto set my hand this 18th day of April, 1922.

CARL F. SCOTT.